May 26, 1959 — D. J. BURKE — 2,887,743
CAST WELDING APPARATUS
Filed July 16, 1953

INVENTOR.
DONALD J. BURKE
BY
Oberlin & Limbach
ATTORNEYS.

United States Patent Office 2,887,743
Patented May 26, 1959

2,887,743
CAST WELDING APPARATUS

Donald J. Burke, Cleveland, Ohio, assignor to Erico Products, Inc., Cleveland, Ohio, a corporation of Ohio Application July 16, 1953, Serial No. 368,477

4 Claims. (Cl. 22—116)

This invention relates as indicated to welding apparatus, and more particularly to a novel mold construction for the cast welding of signal bonds to steel rails.

In Patent No. 2,229,045 of Charles A. Cadwell, there is disclosed a welding material adapted for use in an exothermic reaction comprising a mixture of copper oxide and a crushed copper aluminum alloy which, when ignited, will produce a charge of molten copper suitable for immediate use in the welding of a copper or copper alloy rail bond to a steel rail or the like. Patent No. 2,277,014 to Noble G. Carlson discloses a form of rail bonding apparatus particularly suited for use with the aforesaid welding material in the attachment of rail bonds to rails, such apparatus comprising two spaced mold blocks and common clamping means therefor adapted to clamp the same against the side of a rail head. Such welding material and apparatus have enjoyed great commercial success for the past several years.

When a rail head has become worn, the lateral surface remaining for attachment of a signal bond thereto may become quite narrow, thus rendering it difficult to cast weld a terminal thereto. In view of the relatively small charge of molten copper ordinarily employed for the purpose, it is necessary that such charge of molten copper be at a relatively high temperature when it enters the mold cavity enclosing the bond end, and in the past it has been the practice to employ all or substantially all of the molten copper produced to form the terminal. The chilling effect of the mold and, more importantly, the chilling effect of the steel rail head and copper bond acts to cool a portion of the molten copper discharged into the mold cavity to such an extent that there are frequently local areas where the cast terminal fails to adhere to any important extent to the rail. As above indicated, however, utilizing all of the molten copper produced, a sufficient portion of the terminal will ordinarily be securely welded to the steel rail for practical purposes.

A badly worn rail ordinarily forms a laterally extending lip adjacent its upper outer edge and in order to afford sufficient room for the welding operation, it is the usual practice to grind such lip away. This is an expensive and time-consuming procedure. On the other hand, to provide a mold block having a sufficiently small mold cavity to permit it to fit below such lip has not in the past been feasible since an insufficiently strong weld would be obtained.

It is accordingly a principal object of my invention to provide welding apparatus, and more particularly an improved mold construction for the cast welding of rail bonds to steel rails which will be suitable for employment on badly worn rails affording reduced lateral surfaces and having lips protruding from their upper side edges.

Another object is to provide such apparatus which will ensure a very strong welded connection of high electrical conductivity despite its very small size.

Still another object is to provide such small strong welded connection which will be less susceptible to damage by dragging equipment and which will be neat and smoothly contoured without the usual recess in its upper surface due to accumulations of slag.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
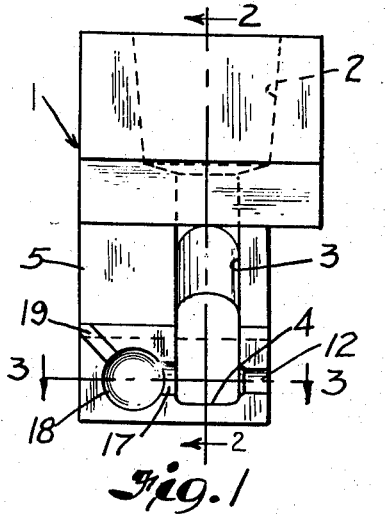
Fig. 1 is an elevational view of a mold block showing the sprue and mold cavities therein.
Figure 2:
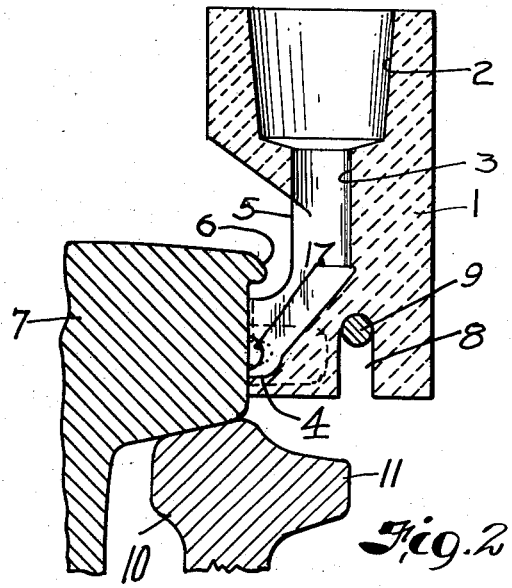
Fig. 2 is a vertical section taken on the line 2—2 through the mold block of Fig. 1 and showing the latter positioned against a worn rail.
Figure 3:
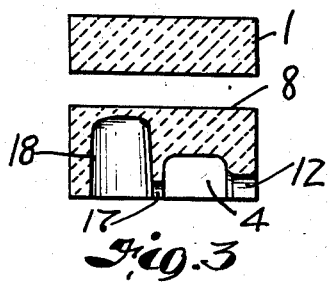
Fig. 3 is a transverse section taken on the line 3—3 of Fig. 1.
Figure 5:
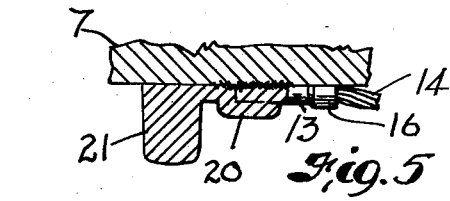
Fig. 5 is a fragmentary horizontal section taken on the line 5—5 of Fig. 4.
Figure 4:
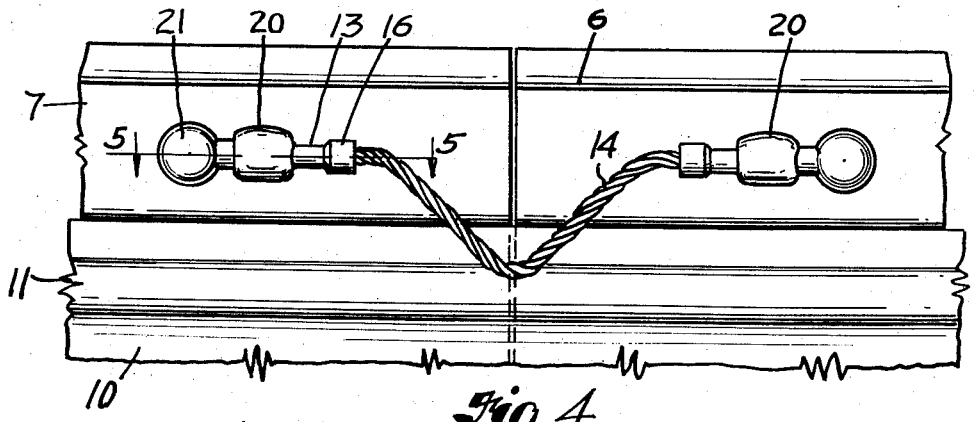
Fig. 4 is an elevational view showing a rail joint with a signal bond welded to the sides of the rail heads of the opposed rail ends.

Referring now more particularly to said drawing and especially Figs. 1–3 thereof, pairs of mold blocks such as that illustrated may be mounted in a supporting frame of the general type illustrated in the application of Edward B. Neff, Serial No. 92,067, filed May 7, 1949, now Patent No. 2,654,129, issued October 6, 1953, or that of my prior application Serial No. 224,349, filed May 3, 1951, now Patent No. 2,680,271, issued June 8, 1954. Reference may be had to these two applications for details of such supporting frames and suitable means for clamping the mold blocks against the side of the rail head. The present invention relates only to the mold assembly itself and the manner of employing the same.

The mold assembly of the embodiment here illustrated comprises a graphite block 1 hollowed out in its upper portion to provide a crucible 2 with a sprue passage 3 leading downwardly therefrom to a mold cavity 4. The face of the mold block is cut away at 5 above the mold cavity to avoid interference with the lip 6 of a worn rail head 7. The bottom of the mold block may be grooved as at 8 to receive a supporting pin 9 in the manner explained in detail in my aforesaid prior application Serial No. 224,349. However, a variety of known methods for mounting the mold blocks may be employed as desired.

Most joint bars 10 employed by railroads in this country are provided with an outwardly protruding knuckle portion 11 which renders impossible the employment of a mold block protruding downwardly appreciably below the rail head. A very limited working space may accordingly be available between the lip 6 of the rail and the knuckle 11 of the joint bar.

Figure 6:
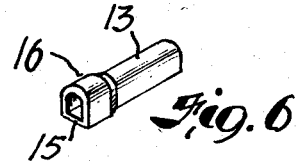
Fig. 6 is a detail view of a preferred form of bond end sleeve for employment in my new apparatus.

A lateral passage or recess 12 extends from mold cavity 4 to the side of the mold block and is adapted to receive and closely embrace the compressed tubular copper sleeve 13 in which the end of the usual stranded copper conductor 14 is clamped. Such sleeve will preferably be formed of copper tubing fitted over the end of the conductor cable 14 and then compressed between powerful dies to the shape best shown in perspective in Fig. 6. A relatively small sleeve terminal is thus obtained which will occupy a minimum amount of space in the mold cavity 4 and accordingly permit a very small size mold cavity to be employed. The face 15 of the sleeve opposed to the side of the rail head is flat in order to fit snugly thereagainst and a somewhat less compressed collar portion 16 assists in controlling the extent to which the terminal protrudes into the mold cavity as well as guarding against the escape of molten metal through passage 12.

Extending from mold cavity 4 in the opposite direction from passage or recess 12 is another short passage or recess 17 which leads to a deep cavity 18 drilled into mold block 1. An upwardly inclined vent passage 19 leads to the outer atmosphere from the upper portion of cavity 18. It will thus be seen that cavity 18 serves as an overflow receptacle for molten metal discharged from crucible 2 through sprue passage 3 into mold cavity 4. If sufficient molten copper is produced to fill both cavities 4 and 18, the portion of such molten metal which first arrives in mold cavity 4 will be forced through passage 17 into overflow cavity 18 after giving up a considerable amount of heat to the bond end and rail face. Accordingly, the highly heated molten copper which last arrives in the mold cavity 4 will not be so abruptly chilled, but instead will find the bond end and rail face already heated and will form an excellent and uniform weld therewith despite the small size of mold cavity 4 and therefore the relatively small amount of weld metal which can be contained therein.

In view of the very small size of the welded terminal produced, it is more important than usual that a properly formed terminal be provided and that the upper portion of the same should not be displaced by the weight of the molten slag which follows the molten metal from the crucible. By properly selecting the size of the charge so that the overflow cavity 18 is at least substantially filled, the level of the molten metal in the mold cavity may be maintained at the desired height despite the weight of the slag resting thereon, and such slag will be unable to displace the same. The effect is thus quite different than when an overflowing opening is provided from the mold cavity directly to the exterior of the mold block and the excess molten metal is simply permitted to escape.

When the mold block is subsequently removed from the rail head, it will be seen that a small neat cast terminal 20 has been produced from which sleeve 13 protrudes and which is joined at its other side by a thin neck of metal to a relatively large protruding mass of cast metal 21 which, however, does not adhere tenaciously to the side of the rail head. If desired, such excess metal 21 may readily be detached but ordinarily there will be no harm in leaving it in place.

In operation, two of my new mold blocks will be clamped to the side of the rail head with the mold cavities positioned below any lip which may have been formed on the rail head. It is accordingly unnecessary to grind away such lip although a small area on the side of the rail head which is to be opposed to the mold cavity should be scraped or ground clean. This latter operation, however, may be very quickly accomplished. A rail bond of the type described is held with its sleeved ends clamped in the respective mold cavities and with the flat sides of such sleeved ends pressed against the side of the rail head. Metal producing exothermic reaction material such as that disclosed in Cadwell Patent No. 2,229,045 is placed in the crucible after first closing the sprue openings in the bottoms thereof with thin metal discs, and then ignited, the molten weld metal produced melting through such discs and descending into the mold cavities where it flows against the sleeved ends of the stranded bond and against the cleaned face of the rail head before passing through recess 17 into cavity 18. The amount of the charge will preferably be selected completely to fill such cavity 18 with the last portion of the molten metal descending the sprue being sufficient completely to fill the mold cavity and surround the bond end. Despite the small size of the mold cavity, an excellent and uniform weld is achieved due to the preheating of both the bond and the rail. The slag produced by the reaction accumulates in the sprue above the metal in the mold cavity but does not displace the upper portion of the latter inasmuch as the filling of cavity 18 allows no further metal flow. It will be appreciated that the metal in such cavity 18 tends to solidify rather quickly, having been cooled during its passage thereto. For this reason, it does not tend to weld to the rail at all securely. In contrast thereto, the final portion of the charge of molten metal drops directly from the crucible into the mold cavity with very little opportunity for cooling and due to the preheating of the latter is enabled to make the desired weld.

I am accordingly enabled to attach rail bonds to rails in a superior manner affording an excellent electrical connection and with the terminals of good mechanical strength not likely to be broken by dragging equipment and the like. Moreover, the installation of these bonds is greatly facilitated, especially in the case of worn rails, since the mold block is adapted for use on a relatively narrow rail head even when a lip produced from the latter.

I have found that cavity 18 should be of a size to receive molten metal at least equal in quantity to one-half that required to remain in the mold cavity to form the weld, and it is better for the cavities to be at least equal in size. Ordinarily I prefer that such overflow cavity 18 should be approximately twice the size of the mold cavity, considering the latter to extend upwardly a distance above passage 12 equal to the distance it extends therebelow. In the embodiment illustrated such mold cavity is open upwardly as this facilitates manufacture and also permits ready removal of the mold block from the rail after completion of the welding operation.

Other modes of applying the principle of the invention may be employed, change being made as regards the details described, provided the features stated in any of the following claims or the equivalent of such be employed.

I therefore particularly point out and distinctly claim as my invention:

1. In rail bonding apparatus for the cast welding of a rail bond to the side of a rail head by means of molten metal produced by an exothermic reaction and comprising a graphite mold block having a crucible hollowed in its upper portion, a mold cavity in its flat rail-engaging face adapted to receive the end of a rail bond therein, and a sprue passage leading downwardly from said crucible to said mold cavity; a second cavity in such rail-engaging face of said mold block closely adjacent said mold cavity and approximately twice the size of said mold cavity, a groove in such rail-engaging face of said mold block connecting said two cavities to permit flow of molten metal from said mold cavity to said larger cavity, a small groove in such rail-engaging face of said mold block extending upwardly from said larger cavity to vent gases trapped therein and another groove in such rail-engaging face of said mold block extending from said mold cavity to the side of said block opposite said larger cavity to receive a bond sleeve fitted therein with the end of such bond protruding into said mold cavity; the rail-engaging face of said block being deeply recessed closely above said cavities to avoid interference with any lip which may have been formed on a badly worn rail.

2. In rail bonding apparatus for the cast welding of a rail bond to the side of a rail head by means of molten metal produced by an exothermic reaction and comprising a graphite mold block having a crucible hollowed in its upper portion, a mold cavity in its flat rail-engaging face adapted to receive the end of a rail bond therein, and a sprue passage leading downwardly from said crucible to said mold cavity; a second cavity in such rail-engaging face of said mold block closely adjacent said mold cavity and at least equal in size to said mold cavity, a groove in such rail-engaging face of said mold block connecting said two cavities to permit flow of molten metal from said mold cavity to said larger cavity, a small groove in such rail-engaging face of said mold block extending upwardly from said larger cavity to vent gases trapped therein and another groove in such rail-engaging face of said mold block extending from said mold cavity to the side of said block opposite said larger cavity to receive a bond sleeve fitted therein with the end of such bond protruding into said mold cavity; the rail-engaging face of said block being deeply recessed closely above said cavities to avoid interference with any lip which may have been formed on a badly worn rail.

3. In rail bonding apparatus for the cast welding of a rail bond to the side of a rail head by means of molten metal produced by an exothermic reaction and comprising a graphite mold block having a crucible hollowed in its upper portion, a mold cavity in its rail-engaging face adapted to receive the end of a rail bond therein, and a sprue passage leading downwardly from said crucible to said mold cavity; a second cavity in such rail-engaging face of said mold block closely adjacent said mold cavity, a groove in such rail-engaging face of said mold block connecting said two cavities to permit flow of molten metal from said mold cavity to said second cavity, and a groove in such rail-engaging face of said mold block extending from said mold cavity to the side of said block opposite said second cavity to receive a bond sleeve fitted therein with the end of such bond protruding into said mold cavity; the rail-engaging face of said block being deeply recessed closely above said cavities to avoid interference with any lip which may have been formed on a badly worn rail.

4. In rail bonding apparatus for the cast welding of a rail bond to the side of a rail head by means of molten metal produced by an exothermic reaction and comprising a graphite mold block having a mold cavity in its rail-engaging lateral face and a sprue passage leading downwardly thereto; a second cavity in such rail-engaging face of said mold block closely adjacent said mold cavity and at least one-half the size of said mold cavity, and a groove in such rail-engaging face of said mold block extending from said mold cavity to the side of said block opposite said second cavity to receive a bond sleeve fitted therein with the end of such bond protruding into said mold cavity; the rail-engaging face of said block being deeply recessed closely above said cavities to avoid interference with any lip which may have been formed on a badly worn rail.

References Cited in the file of this patent
UNITED STATES PATENTS

| | | |
|---|---|---|
| 1,738,056 | Hunter | Dec. 3, 1929 |
| 2,081,304 | Moluf | May 25, 1937 |
| 2,277,014 | Carlson | Mar. 17, 1942 |
| 2,360,758 | Cadwell | Oct. 17, 1944 |